(12) United States Patent
Chen et al.

(10) Patent No.: US 8,285,081 B2
(45) Date of Patent: Oct. 9, 2012

(54) METHOD AND DEVICE FOR IMAGE INTERPOLATION CHARACTERISTIC PROCESSING DEVICE AND IMAGE INTERPOLATION DEVICE USING THE SAME

(75) Inventors: Hsing-Chuan Chen, Hsinchu (TW); Tsui-Chin Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1157 days.

(21) Appl. No.: 12/135,221

(22) Filed: Jun. 9, 2008

(65) Prior Publication Data

US 2009/0252438 A1    Oct. 8, 2009

(30) Foreign Application Priority Data

Apr. 8, 2008    (TW) ............................ 97112692 A

(51) Int. Cl.
*G06K 9/32* (2006.01)

(52) U.S. Cl. ...................................... 382/300

(58) Field of Classification Search .......... 345/606; 348/538, E7.012; 358/525; 375/E7.25; 382/300; 386/271; 700/189, 252; 708/290, 313, 847

See application file for complete search history.

(56) References Cited

U.S. PATENT DOCUMENTS 5,760,921 A    6/1998    Miyake
7,200,278 B2    4/2007    Long et al.
2003/0198399 A1    10/2003    Atkins
2006/0164429 A1 *    7/2006    Mantor et al. ................ 345/582
2010/0220232 A1 *    9/2010    Mohapatra et al. ........... 348/448

FOREIGN PATENT DOCUMENTS

| TW | 1220363 | * | 8/2004 |
| TW | 1220363 | | 8/2004 |
| TW | 200536372 | | 11/2005 |
| TW | 200802171 | | 1/2008 |

OTHER PUBLICATIONS

"Office Action of Taiwan Counterpart Application", issued on Sep. 26, 2011, p1-p5, in which the listed references were cited.

* cited by examiner

*Primary Examiner* — Gregory F Cunningham
(74) *Attorney, Agent, or Firm* — Jianq Chyun IP Office

(57) ABSTRACT

An image interpolation processing device is provided for interpolating at least one line between two adjacent lines. A prefetch unit is to prefetch pixel data of the two adjacent lines with a predetermined pixel length, so as to obtain a plurality of basic characteristics that are then stored in a first register. A characteristic processing unit is used for cutting and/or linking the basic characteristics to generate at least one set of linked characteristics. The linked characteristics are stored in a second register, as a reference for an operation unit to perform the interpolation. The operations between the operation unit and the prefetch unit are separated by a predetermined edge length.

26 Claims, 8 Drawing Sheets

METHOD AND DEVICE FOR IMAGE INTERPOLATION CHARACTERISTIC PROCESSING DEVICE AND IMAGE INTERPOLATION DEVICE USING THE SAME

CROSS-REFERENCE TO RELATED APPLICATION

This application claims the priority benefit of Taiwan application serial no. 97112692, filed on Apr. 8, 2008. The entirety of the above-mentioned patent application is hereby incorporated by reference herein and made a part of specification.

BACKGROUND OF THE INVENTION

1. Field of the Invention

The present invention relates to an image processing technique. More particularly, the present invention relates to an image interpolation processing device and a method thereof.

2. Description of Related Art

FIG. 1 is a schematic diagram illustrating spatial lengths of image patterns under different resolutions. As shown in FIG. 1, spatial (images) lengths of the same pattern segment are different under different resolutions. The larger the resolution is, the larger the sampling length of the system is, so as to obtain the same result as that obtained under the low resolution. For example, a length occupied by a window A with a low resolution at the left side of FIG. 1 has to be enlarged to a length occupied by a window B with a high resolution at the right side of FIG. 1, so as to maintain an intact image; otherwise, in case of the high resolution, if the window A with the original low resolution is still applied, only segment information can be observed under the high resolution, which may cause a distortion of the image.

Moreover, lengths of the same oblique line under different resolutions are different. Therefore, when a fixed pixel pipe is used for temporarily storing or analysing data, it can only be applied to a situation of single resolution. Once data with higher resolutions are required to be analysed, inaccuracy due to incomplete scope will affect the final output image quality. A solution of a conventional technique is to increase the pixel pipe up to a maximum demand for a worst case. The so-called worst case refers to a maximum cost of hardware required for implementing a most complicated result. Namely, as long as there is a little possibility of demand, the required circuit resource then has to be reserved in a physical circuit. However, to implement an algorithm with varied complexity based on such method can cause a huge consumption of hardware cost.

For example, FIG. 2 is a schematic diagram of operation windows required when a conventional deinterlacing operation is performed. As shown in FIG. 2, when the deinterlacing operation is performed to two adjacent lines 10 in an image frame, the conventional method is to perform an analysis based on movement of the so-called operation windows. Different data analysis is performed at different time within the operation windows 1~3, and sometimes the data before and after analysed might have an inheritance relation. However, the pixel numbers required by the operation window 1 and the operation windows 2 and 3 might be different, and therefore the maximum pixel pipe length is required, i.e., the so-called fixed scope structure. As described above, change of the resolution might change the length of a diagonal edge. Therefore, the length of the hardware structure has to be elongated for obtaining the intact diagonal edge. However, the maximum length of the pixel pipe is not always used in an actual application. Therefore, such method is not quite economic. Moreover, due to the inheritance of the analysed data, it implies a demand of storing intermediate calculated values; namely, the original data and the intermediate analysed values are required to be stored simultaneously for the conventional method, which may lead to a relatively great cost. Accordingly, only a little data can be obtained, and the hardware structure is limited.

In summary, since performing the diagonal edge enhancement to determine a direction has to observe information of neighbouring pixels of indefinite lengths, a pixel pipe buffer with a certain length has to be set for implementing the conventional method. However, as described above, methods of using the pixel pipe restrict the observable width of the operation window due to limitation of the hardware resources. Moreover, the conventional method has excessive dependence on the original data, causing unavoidable increase of hardware and investment, so that the cost thereof is increased. Moreover, for different resolutions, the solution is either to sacrifice a display quality or increase an extra hardware cost.

Therefore, it requires a simple structure without increasing of the hardware cost for the deinterlacing interpolation technique in order to achieve a displaying correctness under the high resolution.

SUMMARY OF THE INVENTION

Accordingly, the present invention is to provide a device and a method for image interpolation characteristic processing and an image interpolation processing device and a method thereof, which can be applied to various resolution applications without increasing of hardware cost. In this way, the hardware cost can be reduced and the image display quality can be improved.

The present invention provides an image interpolation processing device for interpolating any two adjacent lines within a frame of a display system. The image interpolation processing device comprises a prefetch unit, a first register, a characteristic processing unit, a second register and an operation unit. The prefetch unit is used for prefetching pixel data of the two adjacent lines with a predetermined pixel length, so as to obtain a plurality of sets of basic characteristics. The first register is used for receiving and storing the sets of the basic characteristics. The characteristic processing unit is coupled to the first register, and is used for cutting and/or linking the sets of the basic characteristics to generate at least one set of linked characteristics. The second register is coupled to the characteristic processing unit for storing the linked characteristics. The operation unit interpolates the two adjacent lines according to the linked characteristics, in which operations between the operation unit and the prefetch unit are separated by a predetermined edge length.

Moreover, the present invention further provides an image interpolation characteristic processing device comprising a prefetch unit, a first register, a characteristic processing unit and a second register. The prefetch unit is used for prefetching pixel data of any two adjacent lines in a frame of a displaying system with a predetermined pixel length, so as to obtain a plurality of sets of basic characteristics. The first register is used for receiving and storing the sets of the basic characteristics. The characteristic processing unit is coupled to the first register, and is used for cutting and/or linking the sets of the basic characteristics to generate at least one set of linked characteristics. The second register is coupled to the characteristic processing unit for storing the linked characteristics.

Moreover, the present invention further provides an image interpolation processing method for interpolating any two adjacent lines within a frame of a display system. The image interpolation processing method comprises at least the following steps. First, pixel data of two adjacent lines are prefetched with a predetermined pixel length, so as to obtain a plurality of sets of basic characteristics. Next, the basic characteristics are cut and/or linked to generate at least one set of linked characteristics. Next, a characteristic dictionary file is established according to the linked characteristics. Finally, the two adjacent lines are interpolated according to the characteristic dictionary, in which operations of the interpolation and the prefetching are separated by a predetermined edge length.

Moreover, the present invention further provides an image interpolation characteristic processing method, comprising the following steps. First, pixel data of any two adjacent lines in a frame of a display system are prefetched with a predetermined pixel length, so as to obtain a plurality of sets of basic characteristics. Next, the sets of the basic characteristics are cut and/or linked to generate at least one set of linked characteristics. Next, a characteristic dictionary file is established according to the linked characteristics to function as a reference for an interpolation processing.

According to the present invention, only related characteristics of original pixel data are required to be prefetched, and after the prefetching, operations can be independently performed, and reference of the pixel data (non-characteristic part) is no more required. Moreover, the obtained characteristics are retrieved by trigger for the following interpolation, and therefore analysis is independent to clocks for inputting the pixel data. In addition, regardless of how a system resolution changes, hardware resources required by the system are the same, and thus no extra hardware cost is required.

In order to make the aforementioned and other objects, features and advantages of the present invention comprehensible, a preferred embodiment accompanied with figures is described in detail below.

DESCRIPTION OF EMBODIMENTS

Figure 3:
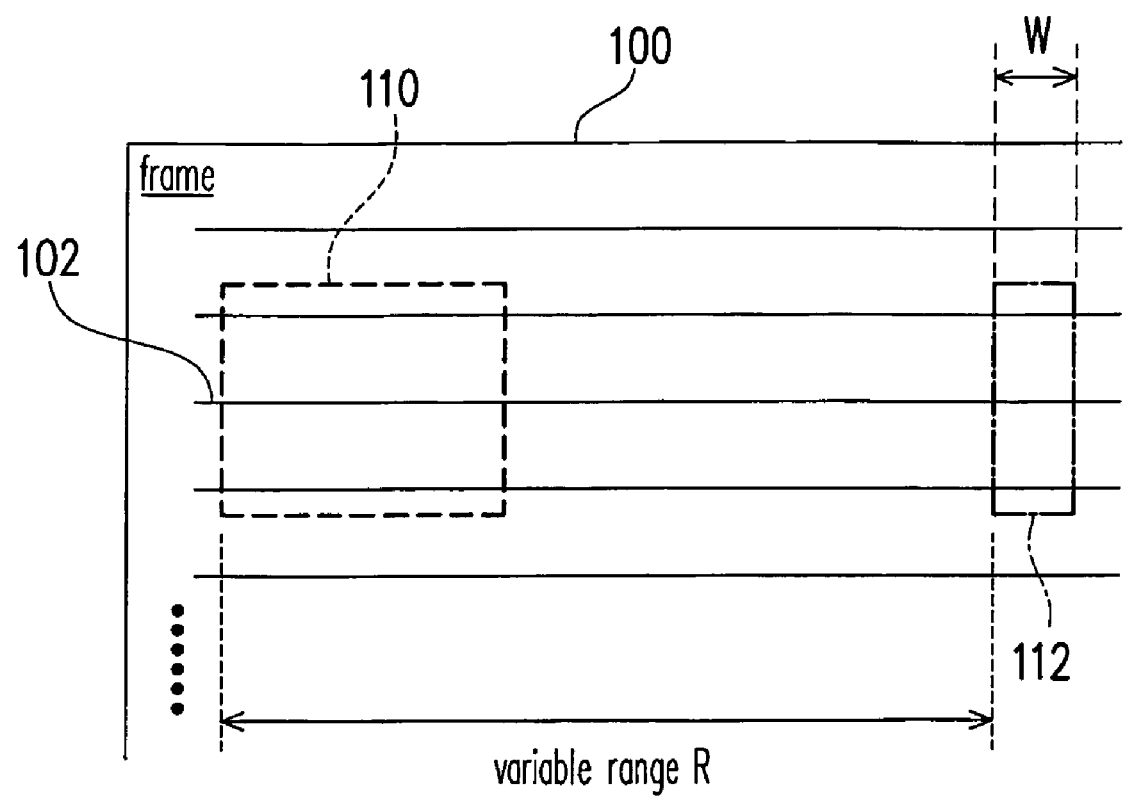
FIG. 3 is a schematic diagram of an operation window required when a deinterlacing operation is performed according to an embodiment of the present invention.

FIG. 3 is a schematic diagram showing an operation window required when a deinterlacing operation is performed according to an embodiment of the present invention. As shown in FIG. 3, the deinterlacing operation of image data of the present embodiment is divided into two stages, one is a prefetch stage, and the other is an operation stage. Operations of the present embodiment are briefly described with reference of FIG. 3.

As shown in FIG. 3, when performing a deinterlacing process, an image processing system first reads line data within frame 100. During reading data, to the reading is not performed with a complete operation window, but is performed with a relatively small prefetch window 112 to obtain a predetermined pixel as prefetch data, i.e., a prefetch operation. Next, the prefetched data is processed to obtain characteristic values (hereinafter, characteristics). The data prefetched by the prefetch window 112 is, for example, pixel data of at least two adjacent lines 102 in the frame 100. The prefetch window 112 has a predetermined pixel width W, and is less than a width of the operation window 110 that is used for the subsequent interpolation processing. When it begins to prefetch pixel data with the prefetch window 112, the pixel data is continuously prefetched with the predetermined width, and is processed to obtain the characteristics. Next, when the prefetch window 112 scans over a variable range R, data processing of the operation window 110 is then stated, i.e., the interpolation processing is performed within the operation window 110, by which at least one line between two adjacent lines is interpolated for displaying.

Figure 1:
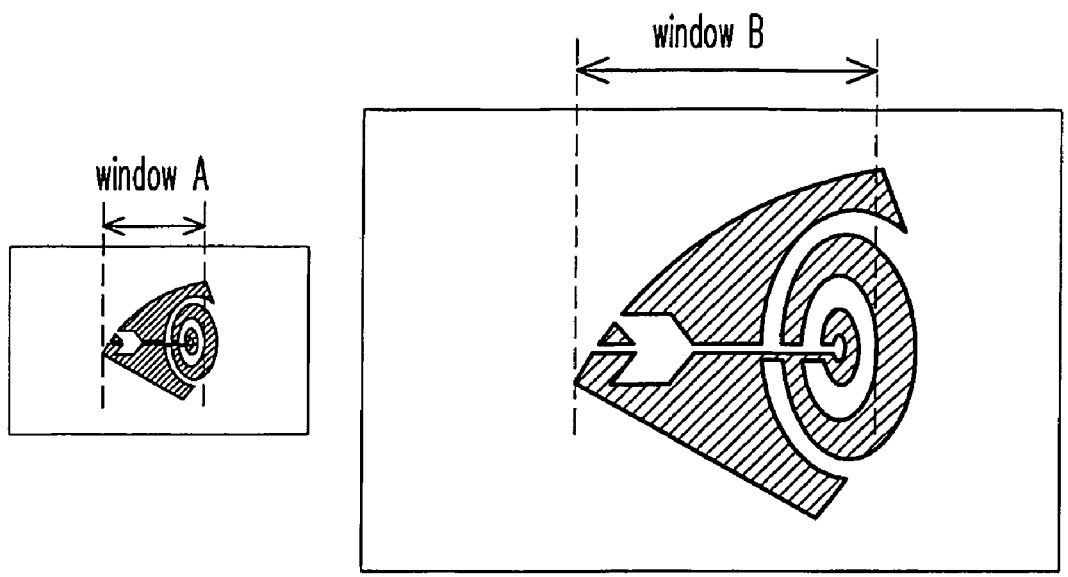
FIG. 1 is a schematic diagram illustrating spatial lengths of images under different resolutions.
Figure 2:
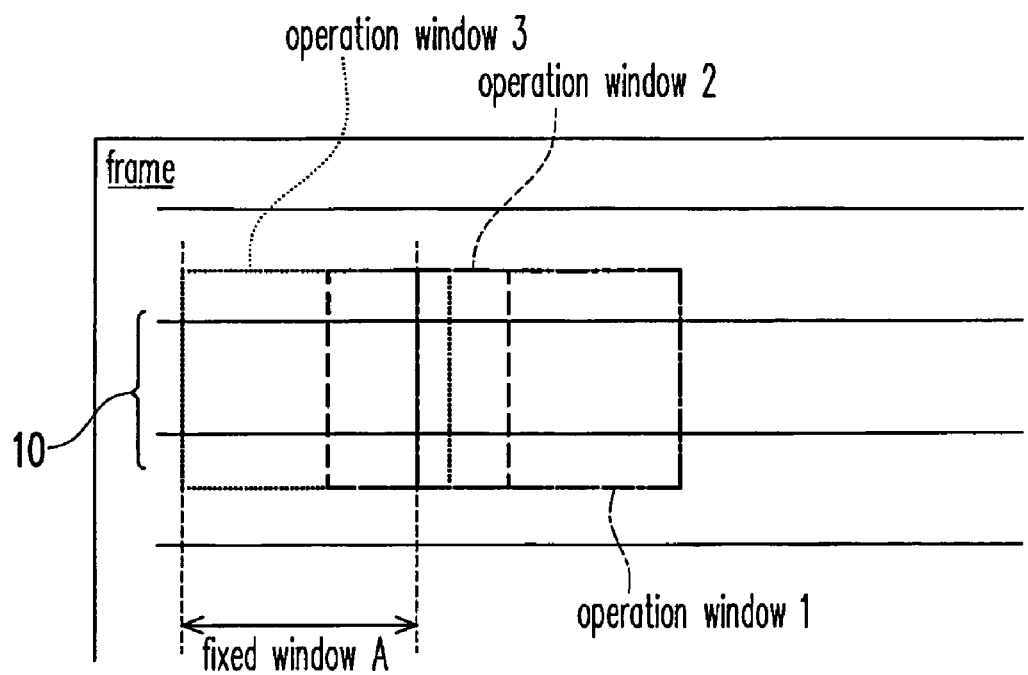
FIG. 2 is a schematic diagram of operation windows required when a conventional deinterlacing operation is performed.

The aforementioned variable range R is one of features of the present embodiment. The variable range R is a length between the prefetch stage and the operation stage, i.e., a scope of the system. In the present embodiment, the variable range R can be varied with a system resolution. With reference of FIG. 1, it can be understood that the variable range R can be extended when the system resolution is high, and shortened when the system resolution is low.

Figure 4:
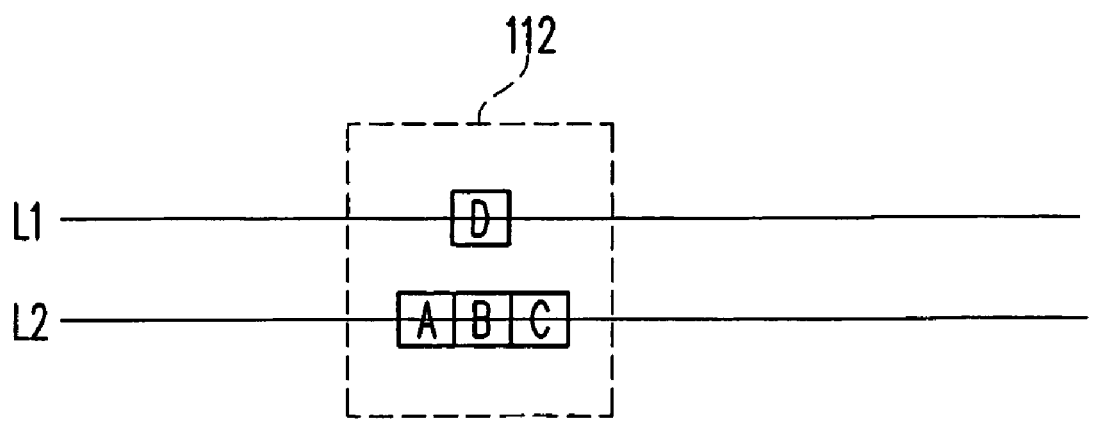
FIG. 4 is a schematic diagram illustrating pixels of two adjacent lines within the prefetch window.

FIG. 4 is a schematic diagram illustrating pixels of two adjacent lines within the prefetch window. As shown in FIG. 4, in a prefetch window 112 of small coverage, pixel data on the two adjacent lines L1 and L2 are transformed into flag data for calculating the characteristics in a vertical direction and a horizontal direction. The characteristics are used for reducing bit number of an intermediate operational values and coherence to the original data.

Next, the characteristics are described. In the present embodiment, data of at least one line is interpolated between two adjacent lines. If the image has an oblique edge, the focus is that a tilting direction, a start pixel, an end pixel and a slope, etc., of the oblique edge have to be known when performing the interpolation. Therefore, the tilting direction, the start pixel, the end pixel and the slope, etc. of the oblique edge are then regarded as the characteristics.

For example, assuming a read width of the prefetch window 112 is 5 pixels, then, in the prefetch stage, when existence of the oblique edge is judged according to pixel data of the first pixel to the fifth pixel, the slope of the oblique line within the window then can be calculated. Accordingly, the first pixel can be regarded as a start pixel, and the fifth pixel can be regarded as an end pixel. Moreover, whether the oblique line is ascendant or descendant can also be judged by to the slope. Therefore, after the prefetching, only the characteristics (referred to as basic characteristics hereinafter) are required to be stored, and storage of the entire pixel data as the conventional technique does is not necessary. To distinguish easily, the prefetched and not processed characteristics are referred to as basic characteristics. In this way, storage capacity for a register can be significantly reduced, and the hardware cost is thus also reduced.

Moreover, the prefetch operations are performed continuously. For example, when the following five pixels are read, the corresponding characteristics can also be calculated. After two or more prefetch operations, more characteristics are generated. However, there are various types of the oblique edge of the image. Through the different types, the basic characteristic obtained in various prefetch stages can be cut and/or linked to further reduce the amount of the characteristics to be stored. The cut and/or linked characteristics are referred to as linked characteristics hereinafter. Various circumstances are briefly described as follows.

Figure 5A:
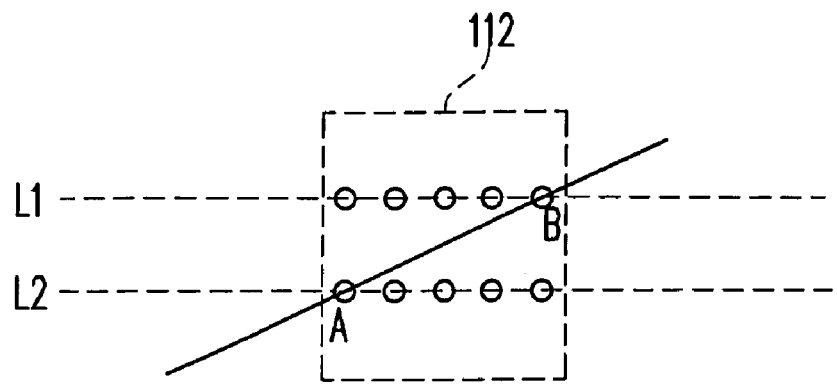
FIGS. 5A~5C are schematic diagrams illustrating prefetch operations and processing of basic characteristics according to an embodiment of the present invention.
Figure 5B:
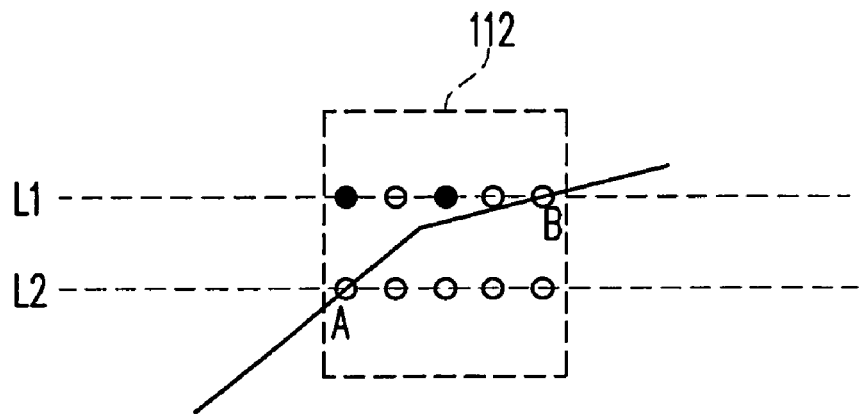
Figure 5C:
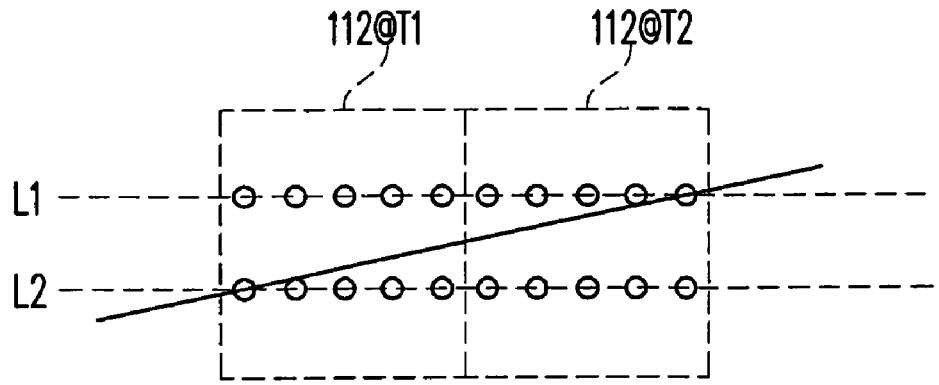

FIGS. 5A~5C are schematic diagrams illustrating prefetch operations and processing of basic characteristics according to an embodiment of the present invention. Referring to FIG. 5A, the oblique edge extends with a fixed trend between the start pixel A and the end pixel B in a prefetch window. However, in FIG. 5B, tilting trend of the oblique edge is varied between the start pixel A and the end pixel B, i.e., the slope is changed in the prefetch window. In such case, an intermediate pixel C then has to be stored as a characteristic value. In other words, the oblique line has two slopes, i.e., AC and CB in the prefetch window. Therefore, a cutting operation is performed thereon. Later, the oblique line with two slopes is then interpolated respectively when interpolation is performed in the operation window.

Moreover, in FIG. 5C, tilting trends of the oblique edges in two adjacent prefetch windows are the same. In such case, storing the characteristics of the two prefetch windows is unnecessary, and by characteristic processing, the end pixel of the prefetch window 112 at time T1 can be combined with the start pixel of the prefetch window 112 at time T2. This operation is referred to as a linking operation.

The two prefetch windows can have different tilting trends respectively, and the characteristics of the two prefetch windows for such case are required to be stored respectively.

The prefetch operation of the present embodiment is to pre-read and pre-process the data will be later interpolated in the operation window 110. As described above, when the interpolation is performed according to the conventional technique, the interpolation of the image is directly performed via the operation window. Therefore, with increasing of the system resolution and length of the operation window, a register with relatively great storage capacity is required to store all of the read pixel data. As a result, the hardware cost is increased for the system with a high resolution.

In contrast, according to the present embodiment, the characteristics of the oblique edge of the image are prefetched through the prefetch operation. Furthermore, only the characteristics are stored, but the other unnecessary pixel data are abandoned. Therefore, the register can only store the characteristics, and storage of data of the whole frame is unnecessary. When the deinterlacing interpolation is performed to the two adjacent lines through the operation window 110, a dictionary file established based on the characteristics is inquired to read the characteristics corresponding to the operation window, so as to achieve the deinterlacing interpolation with a minimum hardware cost.

Figure 6:
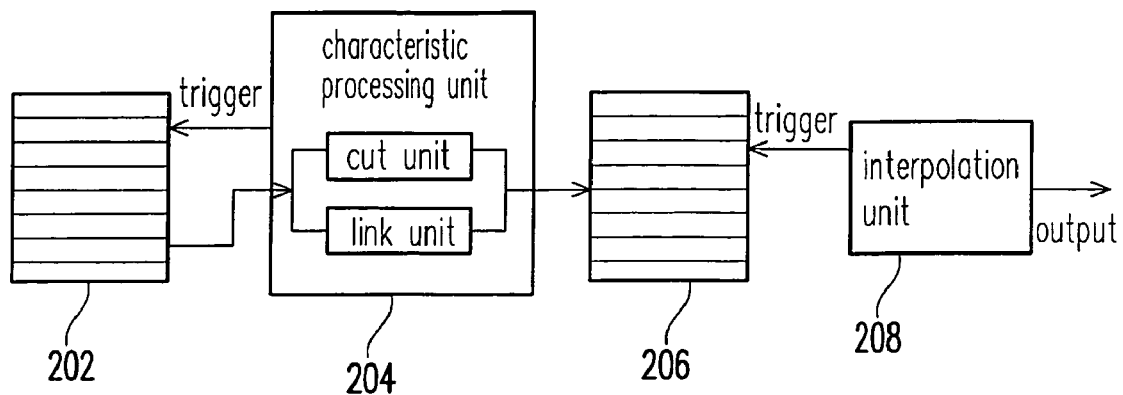
FIG. 6 is a schematic diagram illustrating a hardware structure according to an embodiment of the present invention.

Next, a hardware structure shown in FIG. 6 is further provided for describing the prefetch operation and the processing method of the characteristics. In FIG. 3, the pixel data of the two adjacent lines are first read through the prefetch window 112, and characteristic processing is performed simultaneously. When performing the deinterlacing, the pixel data are scanned from the start pixels (for example, the leftmost of the frame 100) of the two adjacent lines, and the scan operation is performed continuously. When the prefetch window scans a length of the variable range R departed from the start pixels as shown in FIG. 3, the interpolation operation is then performed from the start pixels of the two adjacent lines through the operation window 110. In the present embodiment, the so-called variable range R can be adjusted according to different system resolutions. Namely, a reasonable diagonal edge length with the most tilted inclination is assumed for different system resolution.

FIG. 6 is a schematic diagram illustrating a hardware structure according to an embodiment of the present invention. As shown in FIG. 6, the hardware structure for image deinterlacing interpolation comprises substantially a first register 202, a characteristic processing unit 204 and a second register 206. The characteristic processing unit 204 is coupled to the first register 202 for processing the characteristics stored in the first register 202. The second register 206 is coupled to the characteristic processing unit 204 for storing data processed by the characteristic processing unit 204. Next, hardware operations of the present embodiment are described with reference of FIG. 3 and FIG. 6.

The first register 202 is, for example a first-in-first-out (FIFO) register, and is used for storing the characteristics. As described above, in the prefetch stage, the basic characteristics, i.e., the unprocessed characteristics (such as the start pixel, the end pixel and the slope, etc.) are prefetched from the data read through the prefetch window 112 shown in FIG. 3. The basic characteristics prefetched during each of the prefetch stages are sequentially stored in the first register 202.

The characteristic processing unit 204 further comprises a data cutting unit 204a and a data linking unit 204b. The characteristic processing unit 204 is used for processing each set of the basic characteristics stored in the first register 202, and the processing method comprises cut and link, etc. Description of the cut and/or link operations can be referred to the description of the embodiment of FIGS. 5A~5C, by which the edge characteristics having the same trend that are read through the prefetch operations performed at different time are combined, or the edge characteristics having different tilting trends are cut, so as to simplify the characteristics to be stored. The data cutting unit 204a and the data linking unit 204b are respectively used to perform the aforementioned operations. The data cutting unit 204a and the data linking unit 204b cut and/or link the characteristics according to an image tilting state of the two adjacent lines, wherein the tilting state can be the slope of the image edge.

The second register 206 can also be the FIFO register, and is used for storing the linked characteristics processed by the characteristic processing unit 204. Basically, the second register 206 is established as a characteristic dictionary file to be inquired for the following interpolation.

Moreover, during the prefetch operations, data read by each of the prefetch operations are sequentially stored in the first register 202. Thereafter, the characteristic processing unit 204 can send a trigger signal to the first register 202 to read the basic characteristics stored therein. Next, the characteristic processing unit 204 cuts and/or links the basic characteristics. Next, a dictionary file of the linked characteristics is generated and is stored in the second register 206.

Next, during the interpolation stage, an interpolation processing unit 208 sends a trigger signal to the second register 206 to read the corresponding linked characteristics, so as to perform the interpolation to the two adjacent lines through the operation window 110 shown in FIG. 3.

After the prefetch operation and the characteristics processing, the second register 206 is stored with the characteristics of the oblique edges of the pixels of each lines. Assuming the operation window 110 has 80 pixels, and a first set of linked characteristics obtained by the prefetch operation records a first slope corresponding to the first pixel to the 20-th pixel, a second set of linked characteristics records a second slope corresponding to the 21st pixel to the 80-th pixel, etc. Then, when the interpolation is performed on the first pixel to the 20-th pixel in the operation window 110, the interpolation is then performed based the first set of the linked characteristics read from the second register 206. Additionally, when the interpolation is performed on the 21st pixel to the 80-th pixel, the interpolation is then performed based the second set of the linked characteristics read from the second register 206.

Therefore, according to the present embodiment, the interpolation processing is divided into the prefetch stage and the operation stage. Moreover, as described above, there is no absolute connection between operations of the prefetch stage and the operation stage. Namely, in the prefetch stage, the prefetch operation and calculation of the characteristics are not limited to the clock of inputting pixel data, and can be performed independently. In other words, the system structure provided by the present embodiment can store tilting features of the edges required by the interpolation with flags (i.e., the characteristics), and therefore a dependency with the line pixel data can be ignored.

Thus, in the structure of the present embodiment, a register for storing the read pixel data of the whole frame is unnecessary, and only a register with small capacity is required to store the characteristics. Accordingly, the hardware structure of the present embodiment can be simplified significantly, and the cost can be reduced.

In summary, the deinterlacing interpolation of the present embodiment is divided into two stages including the prefetch stage and the operation stage, and a length between the two stages is a reasonable edge length of a diagonal of the image system (a predetermined edge length). In the prefetch stage, all the basic characteristics required by the system are collected. Next, the basic characteristics are synthetically analysed to obtain the characteristics with higher correlation, i.e., the linked characteristics. Since the deinterlacing processing is to find a start and an end information of a most relevant data segment, intermediate information of each data segment then can be totally omitted. Therefore, after analysing the characteristics, data to be stored is much less than the original data of a whole pixel segment.

On the other hand, after the characteristics are prefetched for the first time, it is not necessary to keep the pixel data since all the required data is ready. The required pixel data is acquired from a frame buffer of the system only when the final interpolation is performed. Such feature allows the two stages of the present embodiment to be operated independently, and accordingly the length between the two windows is not limited by the aforementioned correlation. The window observed by the system are only limited to the originally defined bit number. As long as one more bit is defined at the beginning, a window tolerance thereof is then doubled. Therefore, for the high system resolution, a longer time interval is set, so that operations can be normally and accurately performed.

Figure 7:
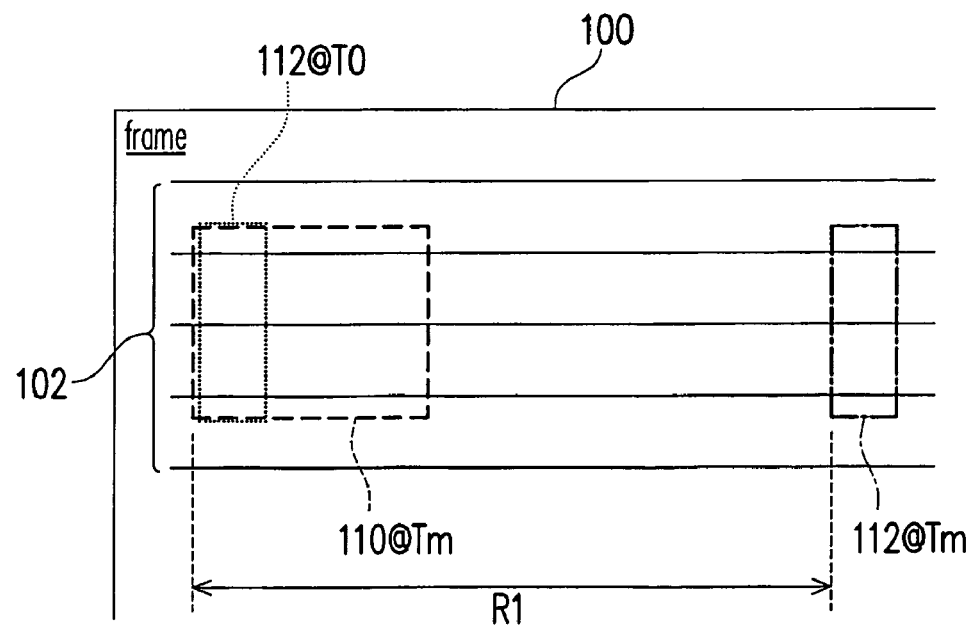
FIG. 7 and FIG. 8 are diagrams illustrating applications of the present invention under different resolutions for explaining the concept of the variable range.
Figure 8:
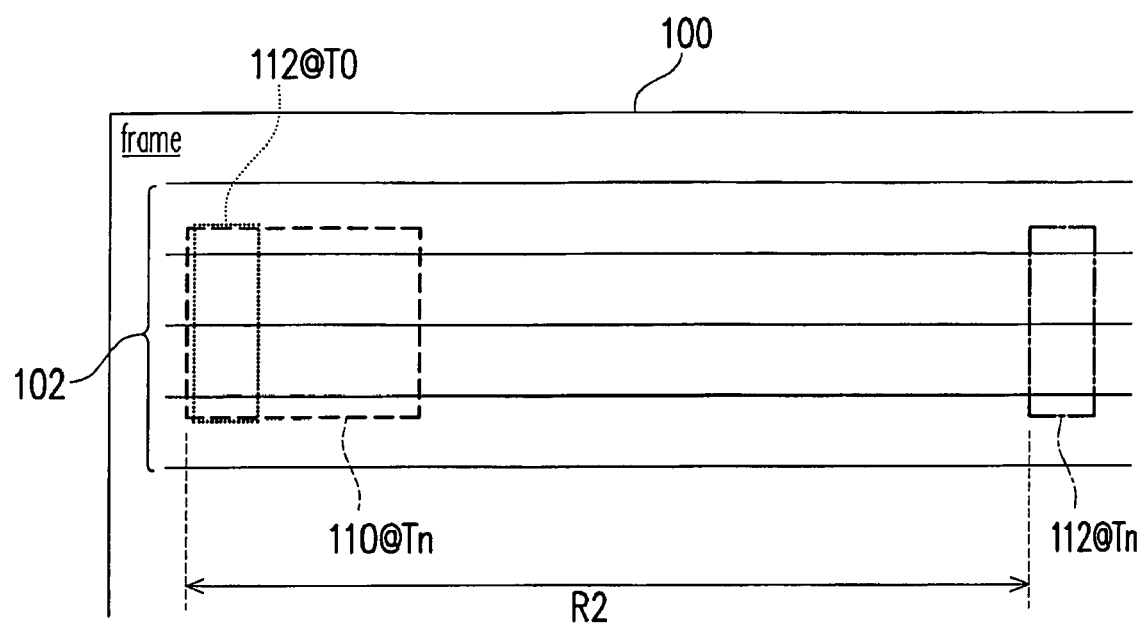

FIG. 7 and FIG. 8 are schematic diagrams illustrating applications of the present invention under different resolutions for explaining the concept of the variable range. FIG. 7 represents a standard resolution, and FIG. 8 represents a high resolution.

As shown in FIG. 7 with the standard resolution, assuming a reasonable and the most inclined edge length (a length occupied by the pixels) of the diagonal is m, and the current distance between two windows (the prefetch and the operation windows) is defined as a variable range R1, i.e., the length of m pixels. Then, from the 0-th pixel to the (m−1)-th pixel, i.e., from a start prefetch window 112@T0 to a prefetch window 112@Tm-1 (not shown), the system is in the prefetch stage and performs the aforementioned prefetch operation to collect the characteristics of the edges of the oblique line. Next, when the prefetch window 112 scans to the m-th pixel, i.e., the prefetch window 112@Tm of FIG. 7, the operation window 110@Tm starts to operate. At this time, the interpolation is performed to generate a deinterlacing point of the first pixel.

In other words, the operation window is inactivated from time T0 to Tm-1. Namely, the interpolation is not performed, and only the characteristics of the edges are collected and then the characteristics are cut and/or linked. As described above, since the operation window 110 in the operation stage is activated by m pixel time later than that of the prefetch window 112, the operation window 110 is also ended m pixel time later.

Similarly, if the image resolution is the high resolution as shown in FIG. 8, the reasonable and most inclined edge length of the diagonal is extended accordingly. Therefore, the intact edge cannot be observed by the system with the original variable range R1 (referring to FIG. 1). In the present embodiment, the variable range can be adjusted to be a variable range R2 as shown in FIG. 8. In this case, a length of the variable range R2 is n pixels. In other words, in the operation stage, the operation window 110 is activated by n pixel time later in comparison with the prefetch window 112, which is shown as operations of the prefetch window 112@T0, the prefetch window 112@Tn and the operation window 110@Tn. Clearly, according to the method of the embodiment, the intact edges can be observed, rather than observing only a part of the edge due to limited hardware resources. Therefore, the image can be displayed correctly.

As shown in FIG. 7 and FIG. 8, the present embodiment can be applied to systems with various resolutions with a minimum hardware resources, and intact of the displayed image can be guaranteed.

Figure 9:
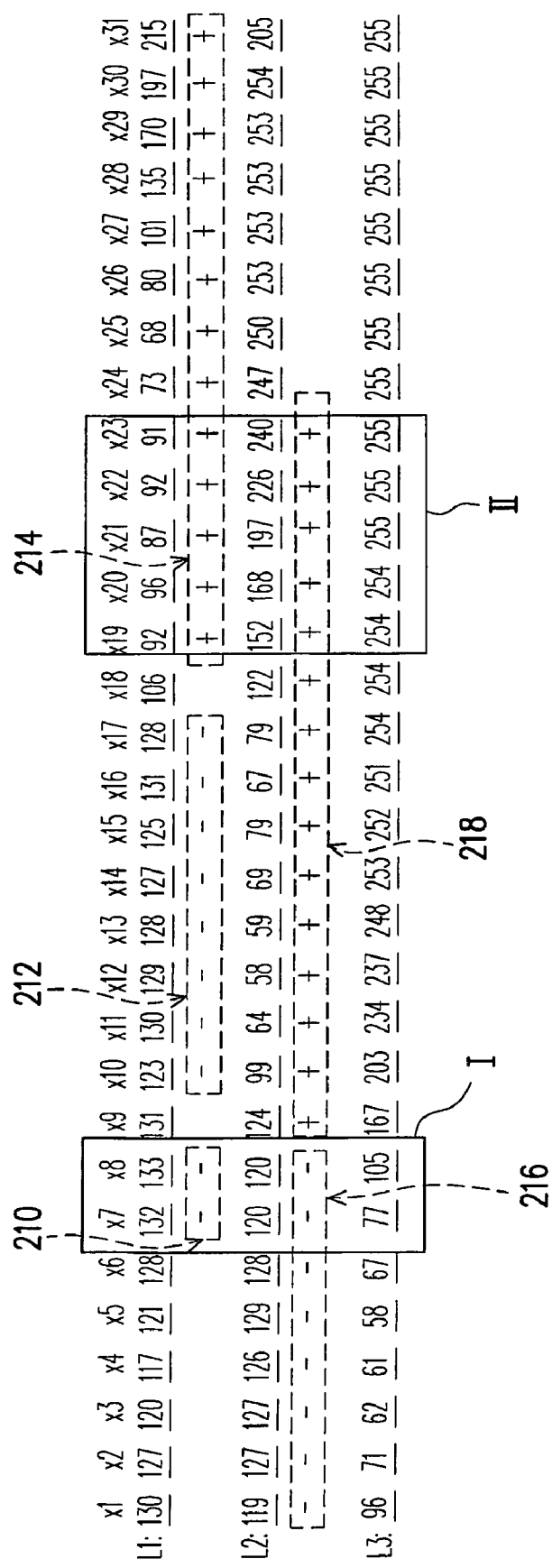
FIG. 9 to FIG. 11 are schematic diagrams illustrating a method of calculating characteristics of the oblique edges with three adjacent lines.
Figure 10:
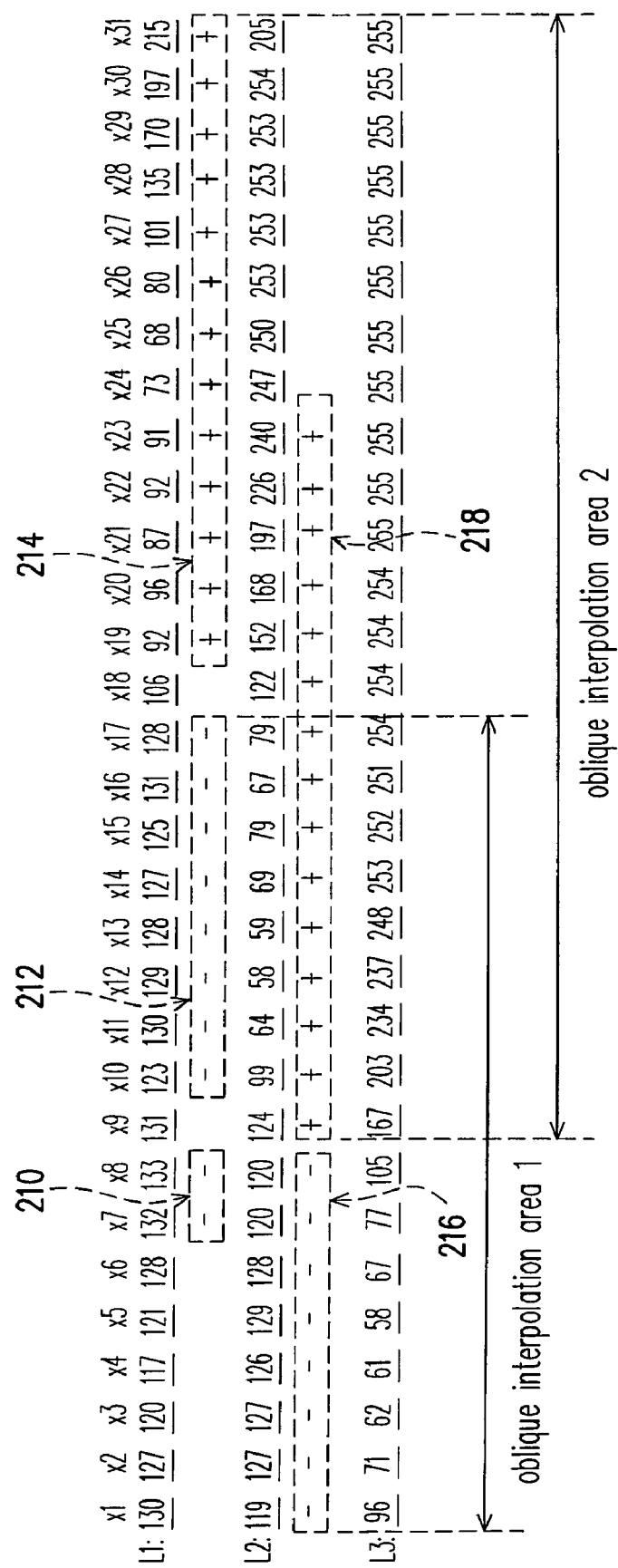
Figure 11:
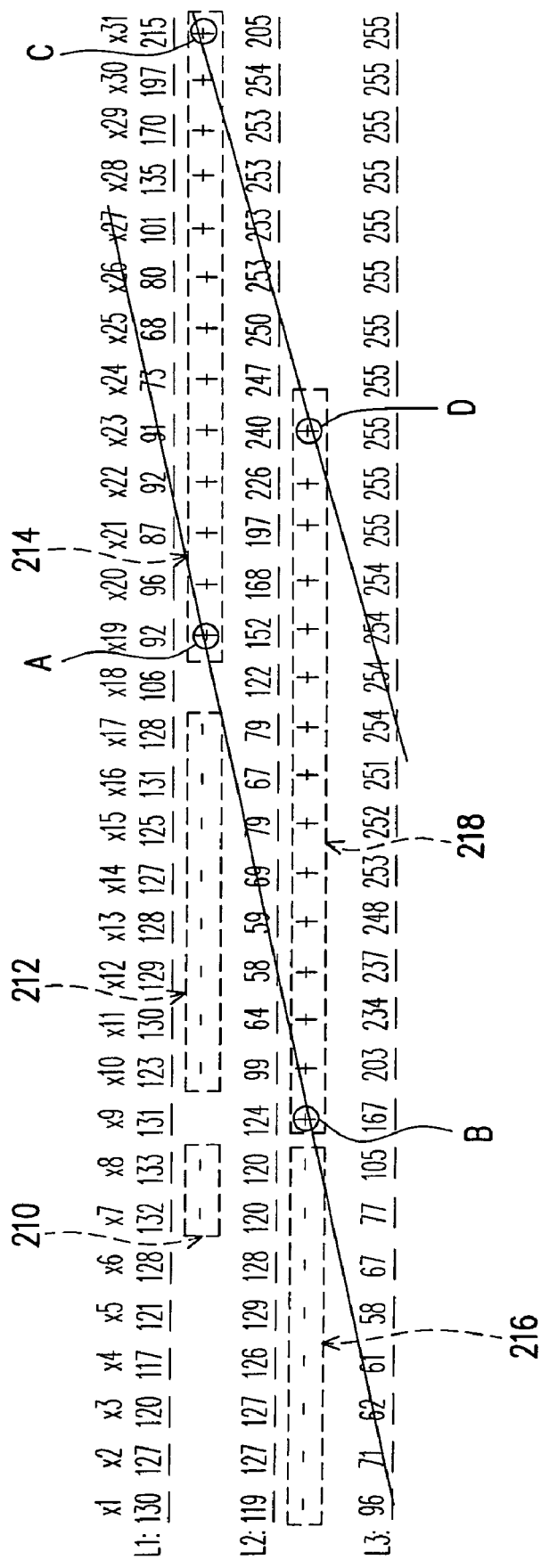

Another embodiment is further provided to clearly explain the characteristics. FIGS. 9 to 11 are schematic diagrams illustrating a method of calculating characteristics of the oblique edges with three adjacent lines.

As shown in FIGS. 9 to 11, two tags of edge areas can be generated based on the three consecutive pixel rows L1, L2 and L3. As shown in FIG. 9, pixel data of the pixel rows L1 and L2 respectively generates a negative edge area 210, a negative edge area 212 and a positive edge area 214. Similarly, pixel data of the pixel rows L2 and L3 respectively generates a negative edge area 216 and a positive edge area 218. The so-called positive and negative represents differences of pixel values between the two adjacent pixel rows, in which a positive difference represents the positive edge, and a negative difference represents the negative edge.

After the edge areas between each of two pixel rows are determined, whether or not the two adjacent edge areas are overlapped or located adjacent to each other is then determined. The so-called overlapped or adjacent to each other represents that between the two adjacent edge areas, there are edges with the same tag between the pixels at the corresponding columns; namely, pixels between the upper and lower pixel rows belong to the same column. For example, as shown in FIG. 9, the negative edge area 210 between the pixels of columns X7 and X8, and between the pixel rows L1 and L2 are overlapped to the negative edge area 216 between the pixel rows L2 and L3, and between the columns X7 and X8, which is referred to as area I. Similarly, the positive edge area 214 between the pixels of columns X19 and X23, and between the pixel rows L1 and L2 are overlapped to the positive edge area 218 between the pixel rows L2 and L3, which is referred to as area II. Moreover, when determining whether or not the two adjacent edge areas are adjacent to each other, a (differential) threshold value can be predetermined to determine whether or not the two oblique edges are adjacent to each other. For example, 5 pixels can be taken as the threshold value for determination, and determination of the number of the pixels can be varied according to an actual requirement.

Once the overlapped area is determined, existence of the oblique edges then can be determined. In other words, when the two adjacent edge areas are overlapped or adjacent to each other, the image within the edge areas is then determined to have the oblique edge. If there only has a single edge area, i.e., the single edge area is not overlapped or adjacent to any other edge area, the oblique edge is then determined as not existed.

When an area having the oblique edge is determined, the area where an oblique interpolation is to be performed is then determined (marked). FIG. 10 is a schematic diagram illustrating areas where oblique interpolation is to be performed.

When the area having the oblique edge is detected, the deinterlacing interpolation is then performed. As described above, during the deinterlacing, the so-called oblique interpolation is performed between two pixel rows in the area having the oblique edge in the same image, while a so-called vertical interpolation is performed between two pixel rows in the area without the oblique edge. Therefore, an area associated with the oblique edge has to be marked, and the oblique interpolation is only performed within such area, while the vertical interpolation is performed outside such area. However, other interpolations can also be used outside such area.

As shown in FIG. 10, when the area having the oblique edges are determined via the edge areas (positive, negative), the upper and lower adjacent edge areas that are overlapped or located adjacent to each other are already marked with the areas where the oblique interpolation processing is required to be performed. The interpolation processing area is a union of the positive and the negative edge areas.

As shown in FIG. 9, an overlapped part of the negative edge areas is the overlapped area I, and therefore the overlapped area I and the adjacent negative edge areas 210, 212 and 216 are all within an area 1 where the oblique interpolation is required to be performed. Similarly, an overlapped part of the positive edge areas is the overlapped area II, and therefore the overlapped area II and the adjacent positive areas 214 and 218 are all within an area 2 where the oblique interpolation is required to be performed. The union of the areas 1 and 2 shown in FIG. 10, i.e., the whole area covering the columns X1 to X31 needs to be oblique interpolated.

Next, when the area that needs the oblique interpolation is determined, an oblique interpolation angle is required to be determined. FIG. 11 is a schematic diagram of detecting the oblique interpolation angle according to an embodiment of the present invention.

After the position of the oblique edges and the areas needing the oblique interpolation are detected, a tilting angle of the oblique edge is then required to be determined. Determination of a correct tilting angle can eliminate sawteeth of the oblique line of the oblique edge, so that the displayed image can be clearer and looks more comfortable, and accordingly resolution thereof is improved. Conversely, an improper tilting angle can decrease the effect of the oblique interpolation, and errors or noises might be generated on the image so as to decrease its resolution.

Based on the aforementioned descriptions, in the areas where the oblique lines of the oblique edges are detected, the angle (slope) information is already included in the upper and lower adjacent edge areas (for example, the edge areas 214 and 218 of FIG. 9).

As shown in FIG. 11, taking the aforementioned positive edge areas as an example, the overlapped area II in FIG. 9 is determined to have the oblique lines of the oblique edges. Next, with a reference of the overlapped area II, the upper and lower adjacent areas are the positive edge area 214 and the positive edge area 218. A slope of the oblique line determined based on the positive edge areas 214 and 218 is a position difference between the edge areas, i.e., the slope of the detected oblique line or an angle formed by connecting the upper and the lower adjacent edge areas. Therefore, determination of the angle can be performed via such upper and lower approach.

As shown in FIG. 11, the first pixel A (column X19) of the positive edge area 214 and the first pixel B (column X9) of the positive edge area 218 are connected to obtain an oblique line AB, and the slope of the oblique line AB can be determined.

According to the embodiments of FIG. 9 to FIG. 11, the characteristics such as the start pixel, the end pixel and the slope, etc., can be determined. Though 31 pixels are used for explaining the embodiments shown in of FIG. 9 to FIG. 11, the characteristics can also be obtained when the same method is applied to the prefetch window with few or more pixels.

In summary, according to the present invention, only the correlated characteristics of original pixel data are required to be prefetched, and after the prefetching, operations can be independently performed, and reference of the pixel data (non-characteristic part) is no more required. Moreover, the obtained characteristics are retrieved by trigger for the following interpolation, and therefore the analysis is independent from clock of inputting pixel data. In addition, regardless of how a system resolution changes, hardware resources required by the system are the same, so that no extra hardware cost is required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image interpolation processing device, for performing an interpolation between any two adjacent lines in a frame of a display system, the image interpolation processing device comprising:

a prefetch unit, for prefetching pixel data of the two adjacent lines with a predetermined pixel length, so as to obtain a plurality of sets of basic characteristics;

a first register, for receiving and storing the sets of the basic characteristics;

a characteristic processing unit, coupled to the first register, for cutting or linking the sets of the basic characteristics to generate at least one set of linked characteristics;

a second register, coupled to the characteristic processing unit, for storing the linked characteristics; and an operation unit, for performing the interpolation to the two adjacent lines, wherein operations between the operation unit and the prefetch unit are separated by a predetermined edge length, and the interpolation is performed based on the linked characteristics.

2. The image interpolation processing device as claimed in claim 1, wherein the operation unit sends a trigger signal to the second register for reading the linked characteristics.

3. The image interpolation processing device as claimed in claim 1, wherein the characteristic processing unit sends a trigger signal to the first register for cutting or linking the sets of the basic characteristics.

4. The image interpolation processing device as claimed in claim 1, wherein the predetermined pixel length is less than a pixel length of an operation window of the operation unit.

5. The image interpolation processing device as claimed in claim 1, wherein the characteristic processing unit further comprises:
 a cutting unit and a linking unit, for cutting or linking the sets of the basic characteristics respectively according to an image tilting state of the two adjacent lines.

6. The image interpolation processing device as claimed in claim 5, wherein the image tilting state is a slope of an image edge.

7. The image interpolation processing device as claimed in claim 1, wherein the interpolation performed by the operation unit is to interpolate at least one line between two adjacent lines.

8. The image interpolation processing device as claimed in claim 1, wherein the predetermined edge length is variable, and is determined according to a resolution of the display system.

9. An image interpolation characteristic processing device, comprising:
 a prefetch unit, for prefetching pixel data of any two adjacent lines in a frame of a display system with a predetermined pixel length, so as to obtain a plurality of sets of basic characteristics;
 a first register, for receiving and storing the sets of the basic characteristics;
 a characteristic processing unit, coupled to the first register, for cutting or linking the sets of the basic characteristics to generate at least one set of linked characteristics; and
 a second register, coupled to the characteristic processing unit, for storing the linked characteristics.

10. The image interpolation characteristic processing device as claimed in claim 9, wherein the characteristic processing unit sends a trigger signal to the first register for cutting or linking the sets of the basic characteristics.

11. The image interpolation characteristic processing device as claimed in claim 10, wherein the predetermined pixel length is less than a pixel length of an operation window used for the interpolation.

12. The image interpolation characteristic processing device as claimed in claim 10, wherein the characteristic processing unit further comprises:
 a cutting unit and a linking unit, for cutting or linking the sets of the basic characteristics respectively according to an image tilting state of the two adjacent lines.

13. The image interpolation characteristic processing device as claimed in claim 12, wherein the image tilting state is a slope of an image edge.

14. An image interpolation processing method, for performing an interpolation between any two adjacent lines in a frame of a displaying system, the image interpolation processing method comprising:
 prefetching pixel data of the two adjacent lines with a predetermined pixel length, so as to obtain a plurality of sets of basic characteristics;
 cutting or linking the basic characteristics to generate one or a plurality of linked characteristics;
 establishing a characteristic dictionary file according to the linked characteristics; and
 performing the interpolation between the two adjacent lines based on the characteristic dictionary file, wherein operations of the interpolation and the prefetching are separated by a predetermined edge length.

15. The image interpolation processing method as claimed in claim 14, wherein cutting or linking the sets of the basic characteristics is performed based on a trigger signal.

16. The image interpolation processing method as claimed in claim 14, wherein during the interpolation, the characteristic dictionary is read according to a trigger signal.

17. The image interpolation processing method as claimed in claim 14, wherein the predetermined pixel length is less than a pixel length of an operation window used for the interpolation.

18. The image interpolation processing method as claimed in claim 14, wherein cutting or linking the sets of the basic characteristics is performed respectively according to an image tilting state of the two adjacent lines.

19. The image interpolation processing method as claimed in claim 18, wherein the image tilting state is a slope of an image edge.

20. The image interpolation processing method as claimed in claim 14, wherein the interpolation is to interpolate at least one line between two adjacent lines.

21. The image interpolation processing method as claimed in claim 14, wherein the predetermined edge length is variable, and is determined according to a resolution of the display system.

22. An image interpolation characteristic processing method, comprising:
 prefetching pixel data of any two adjacent lines in a frame of a display system with a predetermined pixel length, so as to obtain a plurality of sets of basic characteristics;
 cutting or linking the basic characteristics to generate one or a plurality of linked characteristics; and
 establishing a characteristic dictionary file according to the linked characteristics to function as a reference for an interpolation.

23. The image interpolation characteristic processing method as claimed in claim 22, wherein cutting or linking the sets of the basic characteristics is performed according to a trigger signal.

24. The image interpolation characteristic processing method as claimed in claim 22, wherein the predetermined pixel length is less than a pixel length of an operation window used for the interpolation.

25. The image interpolation characteristic processing method as claimed in claim 22, wherein cutting or linking the sets of the basic characteristics is performed respectively according to an image tilting state of the two adjacent lines.

26. The image interpolation characteristic processing method as claimed in claim 22, wherein image tilting state is a slope of an image edge.

* * * * *